No. 754,722. PATENTED MAR. 15, 1904.
L. W. TOWNE.
WHEELED VEHICLE OR MACHINE.
APPLICATION FILED FEB. 21, 1901.
NO MODEL.
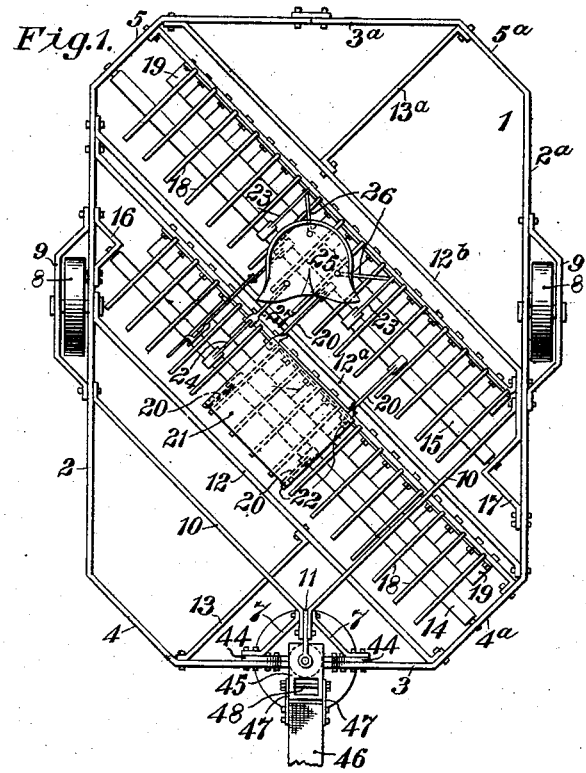
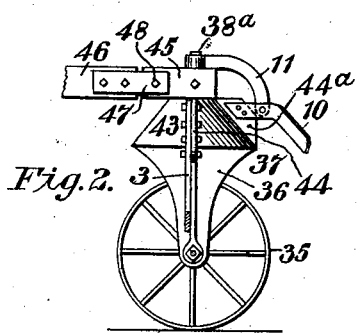
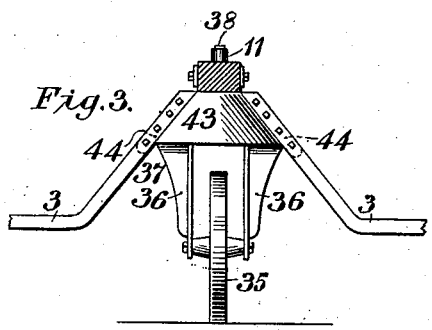
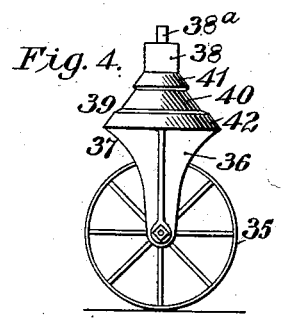
WITNESSES:
C. L. Belcher
Birney Hines
INVENTOR
Lorin W. Towne
BY
Wesley G. Carr
ATTORNEY.

No. 754,722. Patented March 15, 1904.

UNITED STATES PATENT OFFICE.

LORIN W. TOWNE, OF KEENE, NEW HAMPSHIRE.

WHEELED VEHICLE OR MACHINE.

SPECIFICATION forming part of Letters Patent No. 754,722, dated March 15, 1904.

Application filed February 21, 1901. Serial No. 48,275. (No model.)

*To all whom it may concern:*

Be it known that I, LORIN W. TOWNE, a citizen of the United States, residing in Keene, in the county of Cheshire and State of New Hampshire, have invented certain new and useful Improvements in Wheeled Vehicles or Machines, of which the following is a specification.

My invention relates to wheeled vehicles or machines; and it has for its object to provide improved guiding and supporting means for the front ends of such vehicles or machines.

My invention is specially designed for use in connection with wheeled scrapers such as are employed for removing mud and dirt from the surface of macadamized roads and streets; but it is obviously adapted, either in the form shown or when slightly modified, for use in other relations.

In the accompanying drawings, Figure 1 is a plan view of a machine provided with my improvement, the draft appliances being in part broken away. Fig. 2 is a detail side elevation of the front wheel and the parts directly supported thereby. Fig. 3 is a front elevation of the parts shown in Fig. 2. Fig. 4 is a detail side elevation of the front wheel and the bearing-head for the frame.

My invention is here shown as embodied in a wheeled scraper, and in order that it may be fully and clearly set forth in operative relations I will now describe the structure as a whole, in which the skeleton frame 1 of the machine is preferably formed of bar-steel or wrought-iron, the main or outer portion of which may be formed of a single piece, the meeting ends in the rear being joined by means of a reinforcing plate and bolts, as indicated in Figs. 1 and 3 of the drawing. This outer portion of the frame is preferably bent to octagonal form, having parallel sides 2 and $2^a$, parallel ends 3 and $3^a$, and corner-sections 4, $4^a$, 5, and $5^a$ in order that it may be symmetrical in appearance and also be better adapted for the support of those portions of the machine that are movable with reference to the frame.

The axles of the rear wheels 8 are respectively mounted in the sides 2 and $2^a$ of the frame and bracket-pieces 9 bolted or riveted to said sides. The sides 2 and $2^a$ of the frame are connected with the front end 3 by means of diagonal draft and brace bars 10 and short bars 7 at right angles thereto. These draft and brace bars 10 are bolted or riveted together near their meeting ends, and an extension-bar 11 is fastened between them by means of the same bolt or rivet. A diagonal brace-bar 12 is bolted at its respective ends to the side 2 and the corner-piece $4^a$. A similar brace-bar $12^a$ is bolted at its respective ends to the side 2 and the side $2^a$, and a third brace-bar $12^b$ similarly joins the end $3^a$ and the side $2^a$. The bar 12 is joined to the end 3 by a short brace-bar 13, and the bar $12^b$ is connected to the corner-piece $5^a$ by a similar bar $13^a$. Two square shafts 14 and 15 extend parallel to the long brace-bars 12, $12^a$, and $12^b$, the former being journaled at one end in corner-piece $4^a$ and the other end in an angle-iron 16, bolted to the side 2 of the frame. The shaft 15 is journaled at one end in corner-piece 5 and at its other end in angle-iron 17, bolted to side $2^a$. Rigidly fastened to each of these shafts 14 and 15 by means of set-screws or otherwise are the inner ends of a plurality of curved spring-arms 18, sixteen of these spring-arms being shown as fastened to each shaft. The number, however, may obviously be varied, as may be desired in practice. Securely bolted or riveted to the outer free ends of these arms are scraper-blades 19, there being in the form shown one blade for each spring-arm.

In order to exert the amount of pressure upon the scraper-blades that is necessary to insure satisfactory operation and at the same time to provide means whereby such pressure may be regulated or the blades raised completely from the surface, I provide the following instrumentalities: Each of the shafts 14 and 15 is provided with two forwardly and upwardly projecting arms 20, the lower ends of which are rigidly attached to said shafts. A foot-rest 21 is provided with angle-irons 22, the downwardly-projecting portions of which are respectively pivoted to the upper ends of the upwardly and forwardly projecting arms 20. The rear shaft 15 is provided with two upwardly and rearwardly projecting arms 23, the lower ends of which are rigidly connected to said shaft, and the forward shaft is provided with a single upwardly and rearwardly projecting arm 24. A seat 25 for the operator is provided at the rear with two arms 26 of the proper length to elevate the seat sufficiently above the footboard, and the lower ends of these supporting-arms are respectively pivoted to the upper ends of the rearwardly-projecting arms 23, carried by the rear shaft. The front portion of the seat 25 is provided with a single downwardly-projecting arm 27, the lower end of which is pivoted to the single rearwardly-projecting arm 24 on the front shaft. Instead of a single joined connection between the seat and the front shaft two of such connections might be provided, if desired. One will, however, ordinarily be sufficient, and of course simplifies and makes lighter the construction.

It will be seen from the foregoing description that when the operator is on the seat his weight will act upon both shafts through the lever-arms 26 23 and 27 24 and exert the requisite amount of pressure upon the scraper-blades. If, on the other hand, the operator leans forward or stands to bring his weight upon the foot-rest 21, such weight will be sufficient to act through the lever-arms 22 20 to rock the shafts and raise the scraper-blades from the surface of the road or street. The position and movement of the shafts may also be controlled by hand in connection with or independently of the control by the weight of the operator, as is usual in machines of this general character.

The frame is supported, preferably, by three wheels, the two rear wheels being mounted as hereinbefore described. The front wheel 35 is mounted between the lower ends of two arms 36 of a casting 37, the upper end of which is a square block or head 38, having a pin 38$^a$, which receives the front end of a bar 11. The intermediate portion 39 is in the form of a frustum of a cone that has a wide peripheral groove 40 and two bearing-surfaces 41 and 42, respectively, above and below the groove, said groove serving to receive and distribute a suitable lubricant.

A frusto-conical hood 43 fits and rests upon the bearings 41 and 42 and is provided with side wings or flanges 44, to which are bolted or riveted the upwardly-bent ends 3 of the outer frame, and with a rear flange or wing 44$^a$, to which the ends of the bars 10 are bolted or riveted. A pole-iron 45 fits over the head 38 and is fastened thereto by means of a set-screw, the draft-pole 46 being hinged to the pole-iron by means of plates or strips 47 and a pin or bolt 48. It will be readily seen that the construction described affords a strong and well-balanced support for the front end of the machine for every position of the front wheel and the draft-pole and at the same time one that permits the wheel and draft-pole to be turned easily from side to side. This feature of my invention may obviously be embodied in any other type of wheeled vehicle in which either one or two wheels are turned laterally to change the direction of movement of the vehicle as a whole, and hence I do not desire to limit the invention to the specific relations in which it is shown.

I claim as my invention—

1. The combination with a frame, three supporting-wheels therefor, one of which is also a guiding-wheel, and a head supported upon said guiding-wheel and provided with conical bearing-surfaces, of a conical hood that is carried by said frame, fits over and rests exclusively upon said bearing-surfaces and is movable relatively thereto in one plane only.

2. The combination with a frame, three supporting-wheels therefor, one of which is also a guiding-wheel, and a head supported upon said guiding-wheel and having a conical bearing-surface, of a conical hood that is rigidly connected to said frame and rests solely upon said bearing-surface and is movable relatively thereto in one plane only.

3. The combination with a frame and supporting-wheels therefor, of a frusto-conical head supported by at least one of said wheels and having a plurality of inclined, annular bearing-surfaces in different horizontal planes, and a conical hood that constitutes a part of said frame, fits over and rests exclusively upon the bearing-surfaces of said head and is movable relatively thereto in one plane only.

4. The combination with a frame, supporting-wheels therefor and a head supported upon at least one of said wheels and provided with two frusto-conical bearing-surfaces in different horizontal planes and separated by an annular recess, of a conical hood that is carried by said frame, fits over and rests exclusively upon said surfaces and is movable relatively thereto in one plane only.

In testimony whereof I have hereunto subscribed my name this 8th day of February, 1901.

LORIN W. TOWNE.

Witnesses:
C. L. STURTEVANT,
L. G. LITCHFIELD.